United States Patent [19]
Perdue et al.

[11] Patent Number: 5,973,637
[45] Date of Patent: Oct. 26, 1999

[54] PARTIAL PROBE MAPPING

[75] Inventors: Kenneth Lee Perdue, Franklin; William Patrick McCarthy, Indianapolis; Donald D. Cummings; Gerd Wartmann, both of Greenwood, all of Ind.

[73] Assignee: Endress + Hauser GmbH + Co., Maulburg, Germany

[21] Appl. No.: 09/004,906

[22] Filed: Jan. 9, 1998

[51] Int. Cl.⁶ .................................................. G01S 13/08
[52] U.S. Cl. .............................................................. 342/124
[58] Field of Search .................................... 342/118, 123, 342/124; 73/290 R; 367/908

[56] References Cited

U.S. PATENT DOCUMENTS

| | | |
|---|---|---|
| 3,832,900 | 9/1974 | Ross . |
| 3,922,914 | 12/1975 | Fuchs . |
| 3,995,212 | 11/1976 | Ross . |
| 4,135,397 | 1/1979 | Krake . |
| 4,301,681 | 11/1981 | Maltby et al. . |
| 4,322,832 | 3/1982 | Sartorius . |
| 4,698,634 | 10/1987 | Alongi et al. . |
| 4,713,538 | 12/1987 | Theocharous . |
| 4,743,906 | 5/1988 | Fullerton . |
| 4,813,057 | 3/1989 | Fullerton . |
| 4,979,186 | 12/1990 | Fullerton . |
| 5,020,374 | 6/1991 | Petroff et al. . |
| 5,122,800 | 6/1992 | Philipp . |
| 5,226,328 | 7/1993 | Petroff et al. . |
| 5,323,361 | 6/1994 | Elle et al. . |
| 5,333,508 | 8/1994 | Petroff et al. . |
| 5,345,471 | 9/1994 | McEwan . |
| 5,361,070 | 11/1994 | McEwan . |
| 5,363,108 | 11/1994 | Fullerton . |
| 5,376,888 | 12/1994 | Hook . |
| 5,420,517 | 5/1995 | Skaling et al. . |
| 5,436,580 | 7/1995 | Kellmann et al. . |
| 5,457,990 | 10/1995 | Oswald et al. . |
| 5,517,198 | 5/1996 | McEwan . |
| 5,614,911 | 3/1997 | Otto et al. . |
| 5,656,774 | 8/1997 | Nelson et al. . |
| 5,661,251 | 8/1997 | Cummings et al. . |
| 5,677,927 | 10/1997 | Fullerton et al. . |
| 5,767,953 | 6/1998 | McEwan . |
| 5,827,985 | 10/1998 | Grieger et al. . |
| 5,841,666 | 11/1998 | Perdue et al. . |

FOREIGN PATENT DOCUMENTS

| | | |
|---|---|---|
| 0 260 113 | 3/1988 | European Pat. Off. . |
| 0 534 654 | 3/1993 | European Pat. Off. . |
| 33 37 690 | 4/1985 | Germany . |
| 42 04 414 | 6/1993 | Germany . |
| 43 08 373 | 9/1994 | Germany . |
| 44 04 745 | 8/1995 | Germany . |
| 93 24812 | 12/1993 | WIPO . |

OTHER PUBLICATIONS

Steven Arcone, "Conductivity Limitations in Single–Reflection Time–Domain Reflectometry," J. Phys. E. Sci. Instrum. 19 (1986), pp. 1067–1069.

*Primary Examiner*—Ian J. Lobo
*Attorney, Agent, or Firm*—Bose McKinney & Evans LLP

[57] ABSTRACT

A method for processing a time domain reflectometry (TDR) signal having a plurality of reflection pulses to generate a valid output result corresponding to a process variable for a material in a vessel. The method includes the steps of determining a background signal for a probe and detecting a sample TDR signal for the probe in the vessel. At least one transition point is established on the sample TDR signal and the background signal. A portion of the sample TDR signal on one side of the at least one transition point is combined with a portion of the background signal on the other side of the at least one transition point to establish an initial boundary signal, and the initial boundary signal is stored. The method also includes the steps of detecting the TDR signal and calculating the output result using the initial boundary signal.

8 Claims, 13 Drawing Sheets

PARTIAL PROBE MAPPING

BACKGROUND AND SUMMARY OF THE INVENTION

The present invention relates to a processor apparatus and method for a process measurement signal. More particularly, the present invention relates to an improved processor for time-of-flight signals to provide an accurate indication of the location of an interface between a first medium and a second medium in a vessel.

The process and storage industries have long used various types of equipment to measure process parameters such as level, flow, temperature, etc. A number of different techniques (such as mechanical, capacitance, ultrasonic, hydrostatic, etc.) provide measurement solutions for many applications. However, many other applications remain for which no available technology can provide a solution, or which cannot provide such a solution at a reasonable cost. For many applications that could benefit from a level measurement system, currently available level measurement systems are too expensive.

In certain applications, such as high volume petroleum storage, the value of the measured materials is high enough to justify high cost level measurement systems which are required for the extreme accuracy needed. Such expensive measurement systems can include a servo tank gauging system or a frequency modulated continuous wave radar system.

Further, there are many applications that exist where the need to measure level of the product is high in order to maintain product quality, conserve resources, improve safety, etc. However, lower cost measurement systems are needed in order to allow a plant to instrument its measurements fully.

There are certain process measurement applications that demand other than conventional measurement approaches. For example, applications demanding high temperature and high pressure capabilities during level measurements must typically rely on capacitance measurement. However, conventional capacitance measurement systems are vulnerable to errors induced by changing material characteristics. Further, the inherent nature of capacitance measurement techniques prevents the use of such capacitance level measurement techniques in vessels containing more than one fluid layer.

Ultrasonic time-of-flight technology has reduced concerns regarding level indications changing as material characteristics change. However, ultrasonic level measurement sensors cannot work under high temperatures, high pressures, or in vacuums. In addition, such ultrasonic sensors have a low tolerance for acoustic noise.

One technological approach to solving these problems is the use of guided wave pulses. These pulses are transmitted down a dual probe transmission line into the stored material, and are reflected from probe impedance changes which correlate with the fluid level. Process electronics then convert the time-of-flight signals into a meaningful fluid level reading. Conventional guided wave pulse techniques are very expensive due to the nature of equipment needed to produce high-quality, short pulses and to measure the time-of-flight for such short time events. Further, such probes are not a simple construction and are expensive to produce compared to simple capacitance level probes.

Recent developments by the National Laboratory System now make it possible to generate fast, low power pulses, and to time their return with very inexpensive circuits. See, for example, U.S. Pat. Nos. 5,345,471 and 5,361,070. However, this new technology alone will not permit proliferation of level measurement technology into process and storage measurement applications. The pulses generated by this new technology are broadband, and also are not square wave pulses. In addition, the generated pulses have a very low power level. Such pulses are at a frequency of 100 MHz or higher, and have an average power level of about 1 nW or lower. These factors present new problems that must be overcome to transmit the pulses down a probe and back and to process and interpret the returned pulses.

First, a sensor apparatus must be provided for transmitting these low power, high frequency pulses down a probe and effecting their return. Such appropriate sensor apparatus is described in U.S. Pat. No. 5,661,251 entitled SENSOR APPARATUS FOR PROCESS MEASUREMENT and U.S. Pat. No. 5,827,985 entitled SENSOR APPARATUS FOR PROCESS MEASUREMENT, the disclosures of which are hereby expressly incorporated by reference into the present application.

The sensor apparatus is particularly adapted for the measurement of material levels in process vessels and storage vessels, but is not limited thereto. It is understood that the sensor apparatus may be used for measurement of other process variables such as flow, composition, dielectric constant, moisture content, etc. In the specification and claims, the term "vessel" refers to pipes, chutes, bins, tanks, reservoirs or any other storage vessels. Such storage vessels may also include fuel tanks, and a host of automotive or vehicular fluid storage systems or reservoirs for engine oil, hydraulic fluids, brake fluids, wiper fluids, coolant, power steering fluid, transmission fluid, and fuel.

The present invention propagates electromagnetic energy down an inexpensive, signal conductor transmission line as an alternative to conventional coax cable or dual transmission lines. The Goubau line lends itself to applications for a level measurement sensor where an economical rod or cable probe (i.e., a one conductor instead of a twin or dual conductor approach) is desired. The single conductor approach enables not only taking advantage of new pulse generation and detection technologies, but also constructing probes in a manner similar to economical capacitance level probes.

The present invention specifically relates to a signal processor apparatus for processing and interpreting the returned pulses from the conductor. Due to the low power, broadband pulses used in accordance with the present invention, such signal processing to provide a meaningful indication of the process variable is difficult. Conventional signal processing techniques use only simple peak detection to monitor reflections of the pulses.

The present invention provides signal processing circuitry configured for measurement of the time-of-flight of very fast, guided wave pulses. Techniques used in similar processes, such as ultrasonic level measurement are vastly different from and are insufficient for detection of guided electromagnetic wave pulses due to the differences in signal characteristics. For example, ultrasonic signals are much noisier and have large dynamic ranges of about 120 dB and higher. Guided electromagnetic waves in this context are low in noise and have low dynamic ranges (less than 10:1) compared to the ultrasonic signals, and are modified by environmental impedances. The signal processor of the present invention is configured to determine an appropriate reflection pulse of these low power signals from surrounding environmental influences.

Standard electromagnetic reflection measurements are known as time domain reflectometry (TDR). TDR devices for level measurement require the measuring of the time of flight of a transit pulse and a subsequently produced reflective pulse received at the launching site of the transit pulse. This measurement is typically accomplished by determining the time interval between the maximum amplitude of the received pulse. The determination of this time interval is done by counting the interval between the transmitted pulse and the received pulse.

The present invention provides an improved signal processor for determining a valid reflective pulse signal caused by an interface of material in contact with a probe element of a sensor apparatus. The processor apparatus of the present invention is particularly useful for processing high speed, low power pulses as discussed above. In the preferred embodiment of the signal processor apparatus, processing is performed based on a digital sampling of an analog output of the reflective pulses. It is understood, however, that similar signal processing techniques can be used on the analog signal in real time.

It is well known that variations in operating conditions such as environmental variations like temperature, humidity, and pressure; power variations like voltage, current, and power; electromagnetic influences like radio frequency/microwave radiated power which creates biases on integrated circuit outputs; and other conditions such as mechanical vibration can induce undesired drifts of electronics parameters and output signals. The present invention provides a processing means and method for compensating for signal drifts caused by these operating conditions.

According to one aspect of the present invention, a method is provided for processing a time domain reflectometry (TDR) signal to generate a valid output result corresponding to a process variable in a vessel. The method includes the steps of establishing an initial boundary signal, storing the initial boundary signal and detecting a TDR signal. The method also includes the steps of determining a baseline signal by subtracting the initial boundary signal from the TDR signal, determining the reflection pulses in the baseline signal due to the process variable in the vessel, and computing the level of the process variable in the vessel. This aspect presupposes that an initial boundary signal was previously established for the vessel. An initial boundary signal is ideally established by taking a measurement in the vessel when it is empty to map extraneous reflection sources in the TDR signal. However, in operation it is often impractical to empty a vessel every time a probe is installed. This presents a problem in determining the initial boundary signal to be used in the determination of the baseline signal.

A feature of the present invention is a method of determining the boundary signal without requiring that the vessel be emptied. The process of partial probe mapping combines a background signal with a sample TDR signal to create a partial probe map that can be used as the initial boundary signal. The background signal provides an estimate for probe reflections at the end of the probe and other fluctuations in the immersed portion of the newly installed probe. The sample TDR signal provides a mapping of the reflections from vessel artifacts and other sources above the level of the material in the vessel. Partial probe mapping determines the offset to be applied to the background signal and combines the background signal for one portion of the probe and the sample TDR signal for another portion of the probe to calculate an initial boundary signal for use in determining the process variable in the vessel. The calculation of the offset to compensate for differences in the sample TDR signal and the background signal is required for the partial probe mapping.

In one aspect of the present invention a transition point is chosen on the signals to be used as the point where the signals are combined. An offset adjustment is computed to account for differences between the two signals as the difference between the sample TDR signal at the transition point and the background signal at the transition point. This assures an equal signal value for both the background signal and the sample TDR signal at the transition point eliminating any discontinuity at the transition point in the partial probe map.

In another aspect of the present invention an offset adjustment is computed to account for differences between the two signals as the difference between the average signal value of the sample TDR signal above the transition point and the background signal below the transition point. This makes use of the two portions of the signals used to create the partial probe map.

In yet another aspect of the present invention an offset adjustment is computed to account for differences between the two signals as the difference between the average value of the sample TDR below the transition point and the background signal below the transition point.

In another aspect of the present invention an offset adjustment is computed to account for differences between the two signals as the difference between the average signal value over the entire range of the sample TDR signal and the average signal value over the entire range of the background signal.

In another aspect of the present invention an offset adjustment is computed to account for differences between the two signals as the difference between the average signal value over the portion of the sample TDR signal above the transition point and the average signal value over the portion of the background signal above the transition point.

In yet another aspect of the present invention an offset adjustment is computed to account for differences between the two signals as the difference between the average signal value over a small interval of the sample TDR signal above the transition point and the average signal value over a small interval of the background signal above the transition point.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
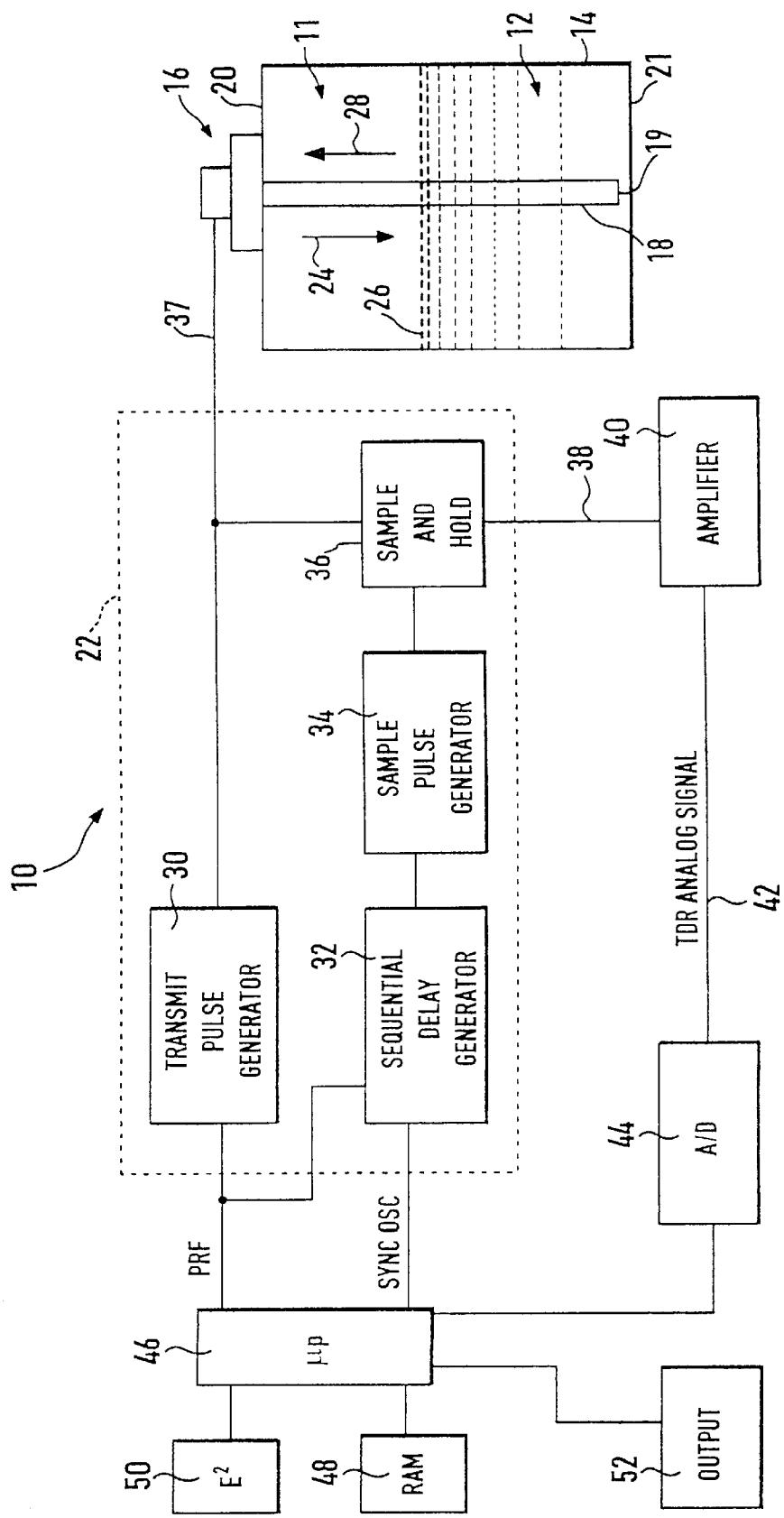
FIG. 1 is a diagrammatical view illustrating a single conductor material level sensor for measuring a level of a process variable such as a liquid in a vessel, and illustrating a block diagram of the pulse transmitter and receiver and the processing circuitry for determining the level of the process variable.

Referring now to the drawings, FIG. 1 provides a diagrammatical illustration of operation of the surface wave transmission line sensor apparatus for process measurement. The apparatus 10 is adapted for use with level measurement of a process variable such as an interface between a first medium 11 and a second medium 12 located within a storage vessel 14. Illustratively, the first medium 11 is air and the second medium 12 is a process variable such as a liquid or other material.

The present invention includes a mechanical mounting apparatus 16 for securing a single conductor transmission line or probe element 18 to a surface 20 of the vessel 14. The mechanical mounting apparatus 16 enables a transceiver 22 to transmit pulses onto the probe element 18 in the direction of arrow 24. Once the pulses reach an interface 26 between the first medium 11 and the second medium 12, such as a top surface of liquid, a reflective pulse is returned back up the probe element in the direction of arrow 28.

The transceiver 22 is coupled to processing circuitry which detects the reflected pulses to interpret the return pulses and to generate an output signal indicating the level of second medium 12 in the vessel 14. Preferably, the transceiver 22 transmits broadband pulses at very low average power levels such as about 1 nW or less, or 1 μW or less peak power. The frequency of the pulses is preferably about 100 MHz or greater.

The transceiver 22 includes a transmit pulse generator 30 which generates a series of the high frequency pulses and transmits these pulses via a cable 32 to mounting 16. Transceiver 22 also includes a sequential delay generator 32 coupled to the transmit pulse generator 30. A sample pulse generator 34 is coupled to the sequential delay generator 32. A sample and hold buffer 36 is coupled to sample pulse generator 34 and to the cable 37. Illustratively, transceiver 22 is a micropower wide band impulse radar transmitter developed by the Lawrence Livermore National Laboratory located at the University of California located in Livermore, Calif. It is understood, however, that other transceivers 22 may also be used with the signal processor apparatus of the present invention.

As discussed above, the mounting apparatus 16 must be specially designed to transmit and receive the low power, high frequency pulses. The above-referenced copending applications, the disclosures of which are expressly incorporated by reference, provide a suitable mounting apparatus 16 for transceiver 22. It is understood that the electronics and processing circuitry may be located at a remote mounting location spaced apart from the mounting apparatus 16.

An output from transceiver 22 on line 38 is coupled to an amplifier 40. An output from amplifier 40 provides a TDR analog signal on line 42. Although the preferred embodiment of the present invention uses a digital sampling system and processes digital signals related to the analog output signals, it is understood that a processor apparatus in accordance with the present invention may be built to process the analog signal directly.

In the present invention, an analog-to-digital converter 44 is coupled to amplifier 40. An output of the analog-to-digital converter 44 is coupled to an input of microprocessor 46. In the illustrated embodiment, microprocessor 46 is a MC68HC711E9 microprocessor available from Motorola. It is understood, however, that any other suitable microprocessor may be used in accordance with present invention. Microprocessor 46 is used to implement both a fast clock and a slow clock. A PRF clock implemented by microprocessor 46, which is a square wave at about 2 MHz, is coupled to transmit pulse generator 30. The microprocessor 46 also implements a sync oscillator, which is illustratively a square wave having a frequency of about 40 Hz. The sync oscillator is coupled to sequential delay generator 32.

Microprocessor 46 is also coupled to RAM 48 and to EEPROM 50. An output terminal of microprocessor 46 is coupled to an output 52. Illustratively, output 52 provides a 4–20 mA output signal to provide an indication of the level of the interface 26 between the first medium 11 and the second medium 12.

The TDR analog signal from amplifier 40 is an equivalent time signal (ETS) of the real time signal traveling on the transmission line system. The ETS is expanded in time by way of digital sampling, thereby enabling the use of conventional hardware for signal conditioning and processing. The signal processor of the present invention provides means for determining a valid pulse reflection, whether in real time or from the ETS. These results allow flexibility to determine information relating to the position of mediums 11 and 12 relative to a top surface 20, a bottom surface 21, a sensor launch plate, or an end 19 of the probe element 18. The process material positional information is derived from signal reflections caused by impedance discontinuities on the transmission line and subsequent signal processing.

The signal responses of a transmission line which includes cable 32, mounting 16, and probe element 18 are dependent upon the inherent transmission design characteristics and impedance changes created by changing boundary conditions. These boundary conditions are used to determine changes in the sensor environment and are directly or indirectly related to the amount or position of the bulk process materials being measured. The impedance of the sensor at a given location can change with variations of the sensor's environment or boundary condition due to interaction of the sensor, its signal, and its surroundings.

Figure 2:
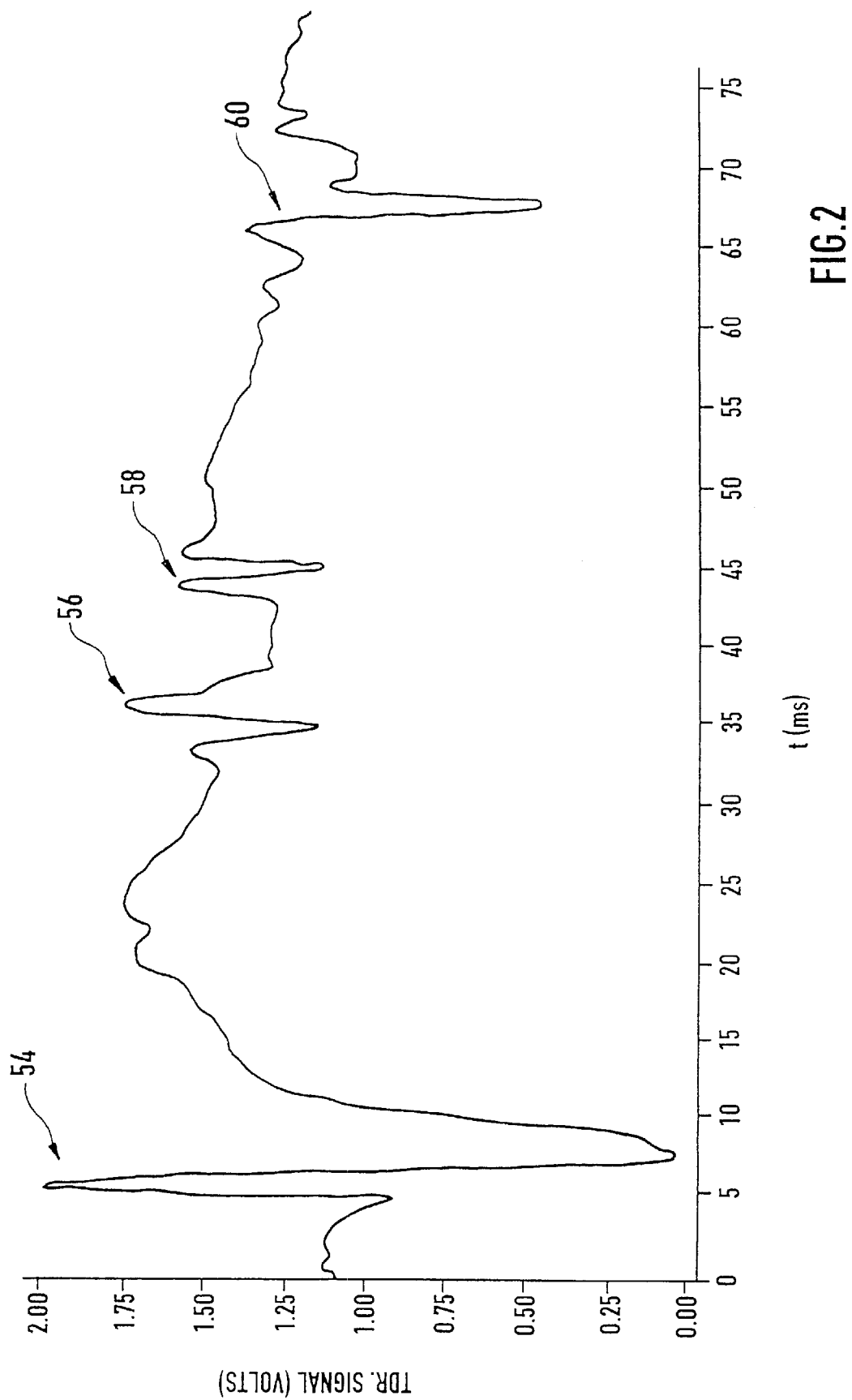
FIG. 2 is an analog signal output of the time domain reflectometry (TDR) signal generated by the transmitter and a receiver.

An example of a time domain reflectometry (TDR) analog signal from amplifier 40 is illustrated in FIG. 2. In FIG. 2, the first large voltage fluctuation or pulse 54 is generated by the impedance change in the mounting 16. In the preferred embodiment, the mounting 16 provides this impedance change as a reference reflective pulse. The second reflective pulse 56 in FIG. 2 is generated by an inherent interference within vessel 14. This interference reflection 56 may be caused by a ladder, door, weld seam, material buildup, or other internal factor from vessel 14. The third reflective pulse 58 is provided by the interface 26 between the first medium 11 and the second medium 12. The fourth reflective pulse 60 is generated by an end 19 of probe element 18.

The present invention initializes the signal processing function by characterizing or recording sensor performance at a given time or under known boundary conditions so that this initial characterization can be used as an initial boundary condition. In other words, a reference or initial boundary signal is measured and stored before the first and second mediums 11 and 12 are placed in the vessel 14.

Figure 3:
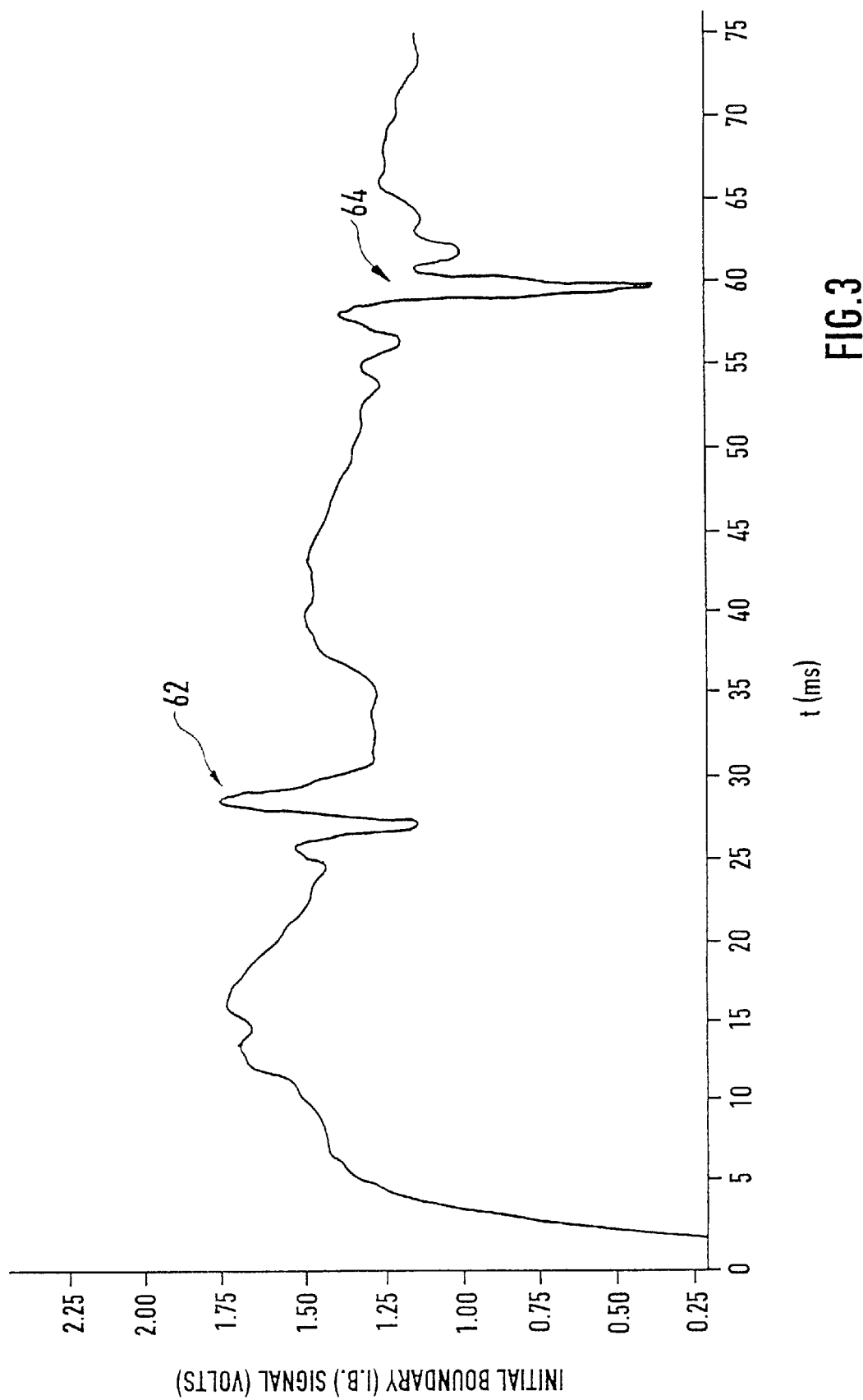
FIG. 3 is an analog output signal indicating an initial boundary condition of the inside of the vessel before the process variable is located in the vessel.

An example of an initial boundary signal (I.B.) is illustrated in FIG. 3. The initial boundary signal is used to help determine a valid impedance change induced reflective pulse caused by interface 26 between first medium 11 and second medium 12. In FIG. 3, the initial voltage peak or reflective pulse 62 is caused by the interference in the vessel 14. Pulse 62 of FIG. 3 corresponds to pulse 56 in FIG. 2. Pulse 64 in FIG. 3 corresponds to the end 19 of probe element 18.

The sensor characterization may include factory calibration, environmental characterization or probe mapping, and sensor recharacterization, or recalibration. The characterization can be done in such a way to permit use of only one or a combination of initialization procedures to provide optimum performance. The characterization of the sensor and its signals inside or outside of its installation environment such as the mounting in the vessel 14 are referred to as its initial boundary conditions.

Factory calibration may include characterizing sensor performance in a stable, known environment which provides a baseline for the system performance while neglecting the influences and effects that are encountered in field installation. A field installation, such as mounting the sensor in a tank or vessel 14, can present an environment for new boundary conditions to the sensor caused by the vessel or permanent contents of the vessel which influence the sensor response due to interaction of the sensor with these vessel contents.

The present invention provides either an automatic recharacterization or a manual recharacterization of the sensor which can be performed to re-establish a new baseline or probe map which enables these environmental changes to be accounted for in determining the valid signal indicating the desired process variable.

A second phase of the signal processor of the present invention involves detecting the pulse reflection produced by a valid signal response of the impedance change along a conductor. In other words, the processor apparatus locates the impedance pulse reflection caused by the interface 26 between the first medium 11 and the second medium 12 in contact with the probe element 18. A number of mathematical techniques can be used to determine the positional information due to impedance changes which generate a signal reflection related in time to the position of the cause of the impedance change along the probe element 18.

Figure 4:
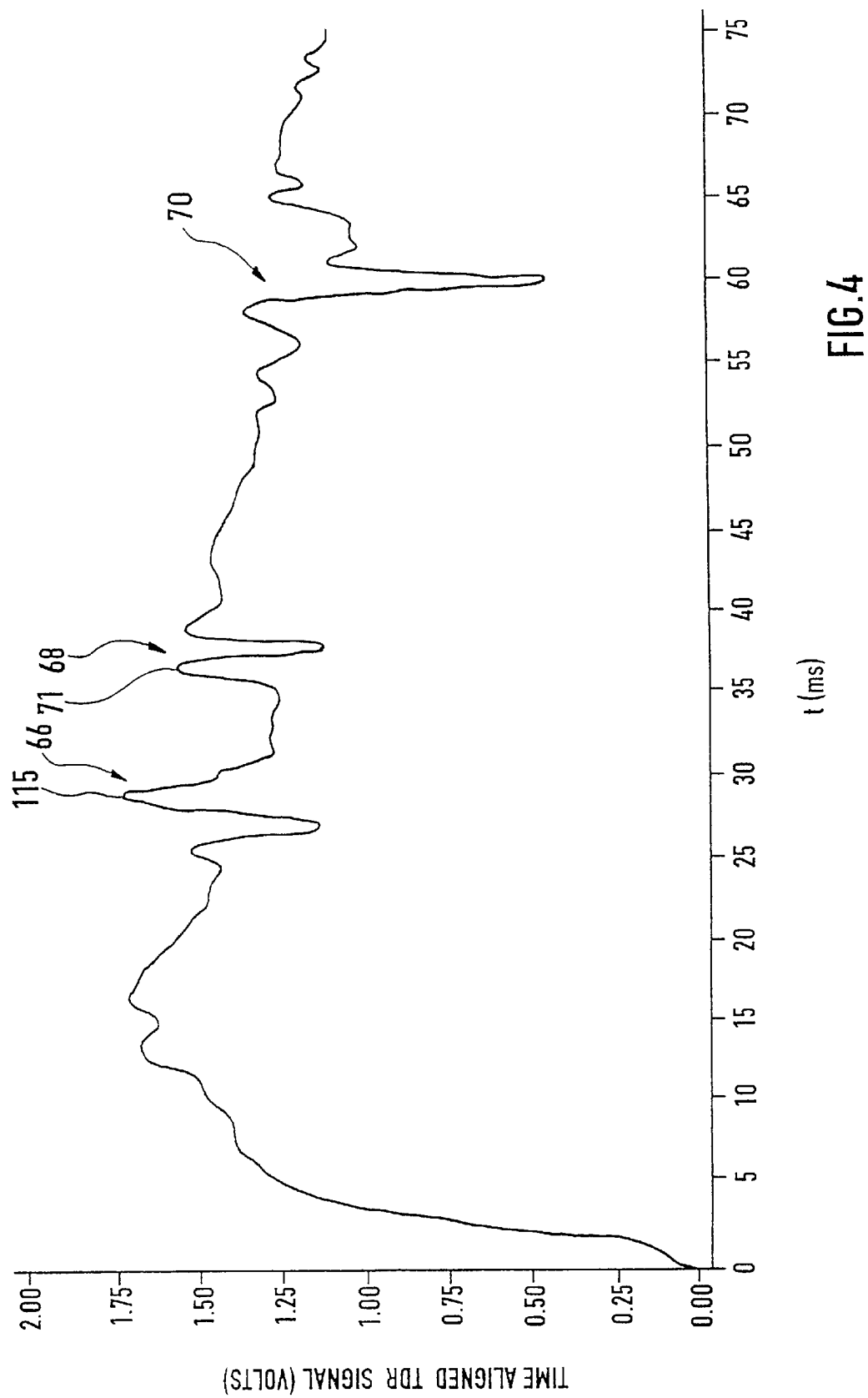
FIG. 4 is a time aligned analog TDR output signal.

Detection of impedance changes may include one or more of the following techniques applied to the TDR analog output signal illustrated in FIG. 2. One detection method is a peak amplitude detection of a Time Aligned TDR signal which is illustrated in FIG. 4. In other words, the signal of FIG. 4 is shifted so that time zero is set as the time of the initial reflecting pulse 54 provided by the impedance change at the mounting 16. In FIG. 4, the first reflection pulse 66 is caused by the interference within vessel 14. Second reflection pulse 68 is caused by interface 26. The third reflection pulse 70 is caused by end 19 of the probe element 18.

Figure 5:
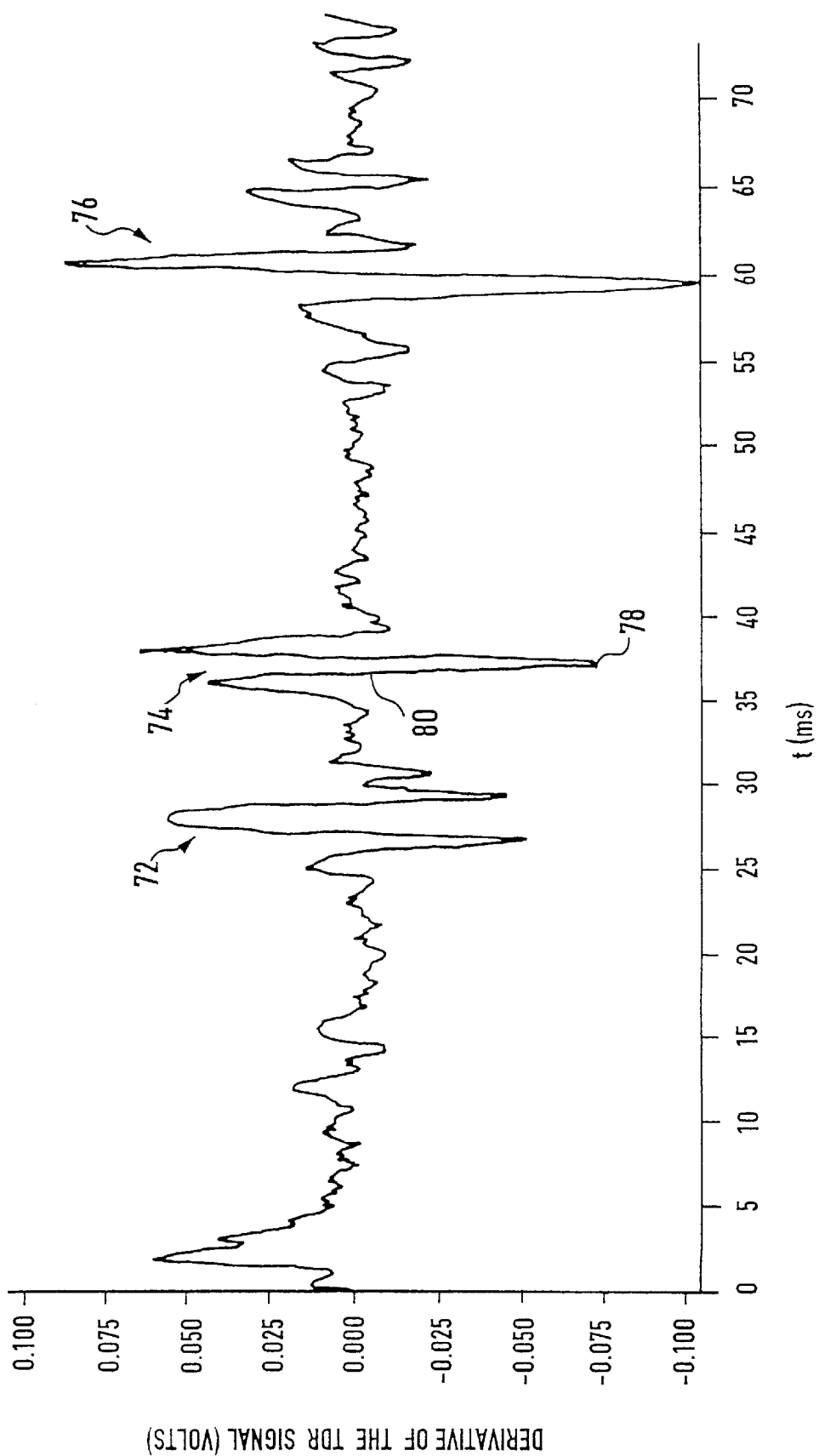
FIG. 5 is an analog derivative signal of the time aligned TDR signal of FIG. 4.

Another detection technique is to determine the first zero crossing after the positive peak of a first derivative signal of the Time Aligned TDR signal of FIG. 4. This derivative signal is illustrated in FIG. 5. Again, the first reflection pulse 72 is caused by the interference within vessel 14. The second reflection pulse 74 is caused by interface 26, and the third reflection pulse 76 is caused by end 19 of probe element 18. Using this technique, the processor apparatus determines the maximum absolute value of the peak reflective pulse, which is illustratively at location 78. If the absolute maximum was a negative value, the preceding zero crossing at location 80 is determined to be the location of interface 26. If the absolute maximum was a positive peak, the next subsequent zero crossing is used as the indication of interface 26.

Figure 6:
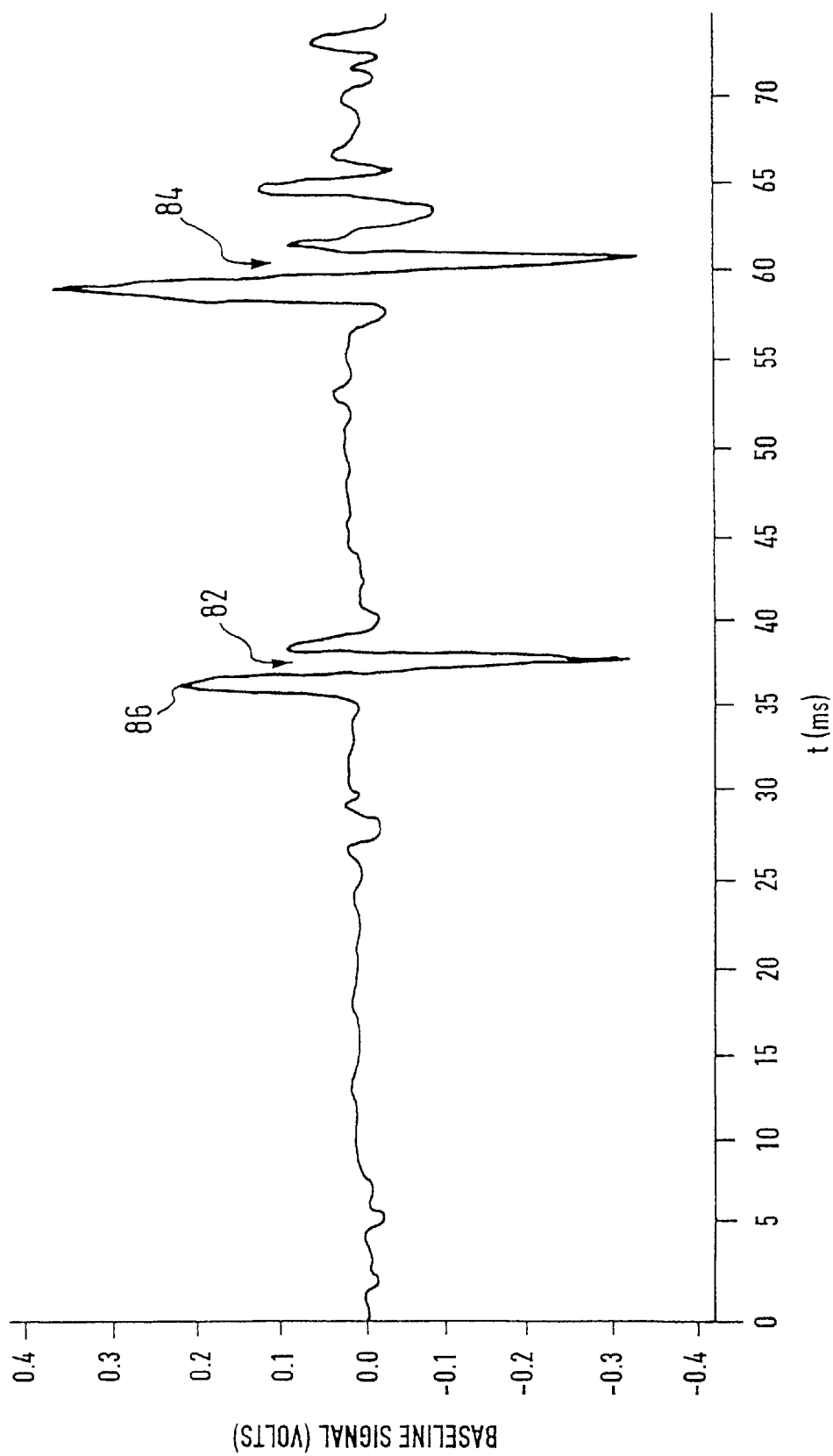
FIG. 6 is an analog baseline signal generated when the initial boundary signal of FIG. 3 is subtracted from the time aligned TDR output signal of FIG. 4.

Yet another technique for determining the valid interface 26 is the use of a baseline signal. The baseline signal is illustrated in FIG. 6. The baseline signal is determined by subtracting the initial boundary signal of FIG. 3 from the Time Aligned TDR signal of FIG. 4. Therefore, the pulse reflection 66 caused by the interference within vessel 14 is canceled by the initial boundary pulse reflection 62. In FIG. 6, the initial pulse reflection 82 is therefore caused by the interface 26 between the first medium 11 and the second medium 12. Reflective pulse 84 is caused by the end 19 of probe element 18. The processor determines the time of the greatest positive peak 86 as the pulse reflection caused by interface 26.

Figure 7:
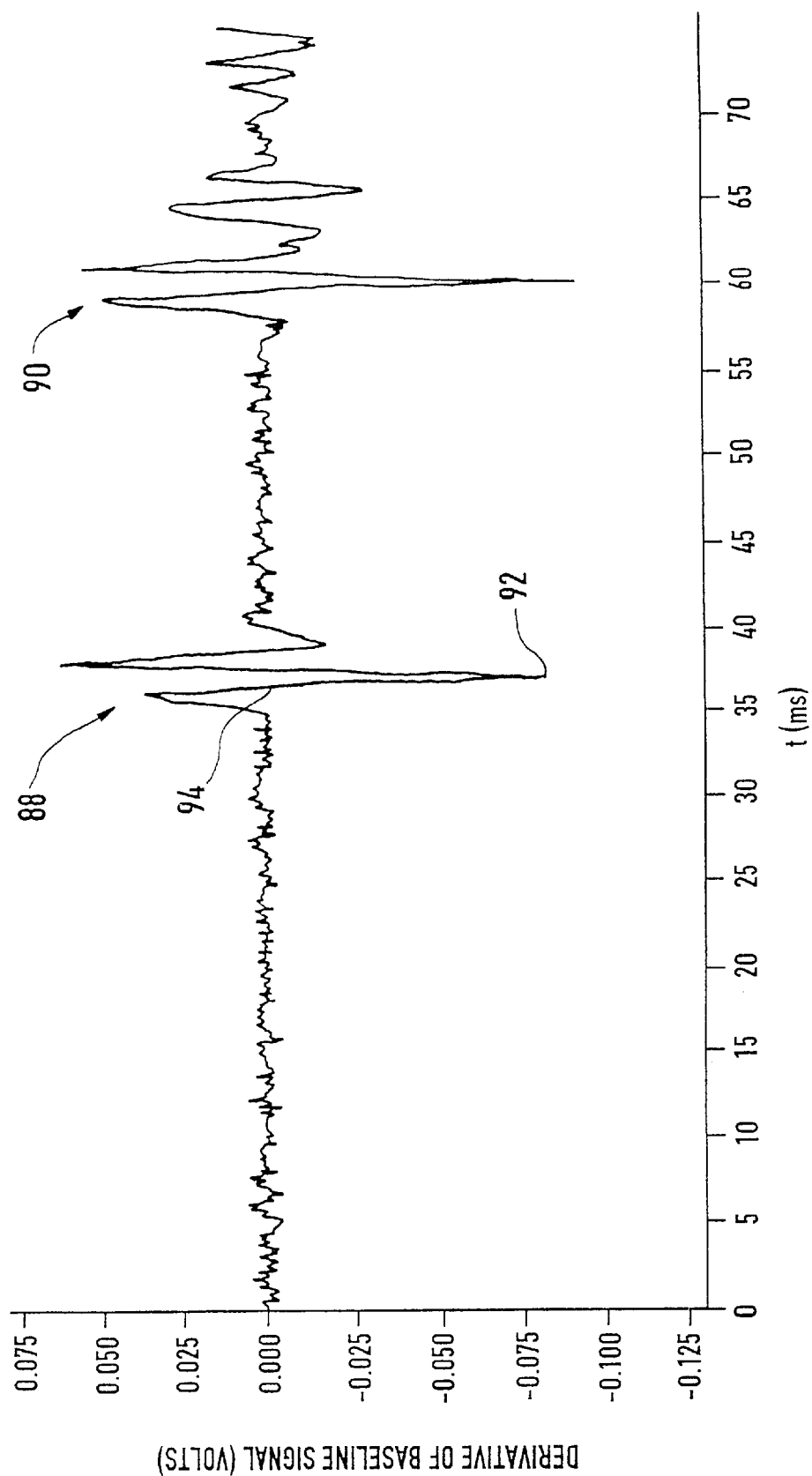
FIG. 7 is an analog signal of a derivative of the baseline signal of FIG. 6.

Still another technique for determining the actual position of interface 26 is to use the first derivative signal of the baseline signal of FIG. 6. The derivative of the baseline signal is illustrated in FIG. 7. Again, the first reflection pulse 88 is caused by the interface 26 between first medium 11 and second medium 12. The second refleciton pulse 90 is caused by end 19 of probe element 18. The processor determines the peak absolute value 92 of the pulse refleciton 88. Since the peak absolute value is associated with a negative voltage, the processor proceeds to the first proceeding zero crossing 94 as the time for the interface 26. If the maximum absolute value was a positive peak, the next subsequent zero crossing is used as the interface level.

Some embodiments of the present invention use a combination of two or more of the above-cited techniques to verify the data related to the valid detection of interface 26. The short term history of the signal can also be used to substantiate the validity of any change in position of the interface 26 and to verify that this change is possible within the process condition presently being used in the vicinity of the sensor.

In a preferred embodiment of the present invention, the processor determines the location of the valid impedance discontinuity caused by interface 26 between first medium 11 and second medium 12 using each of the four techniques or methods discussed above. Each method is assigned a weighted factor. In the illustrated embodiment, the baseline signal calculation illustrated in FIG. 6 is assigned a weighted factor of 1.1, while the other three techniques are assigned a weighted factor of 1.0. These weighted factors provide means for showing the degree of agreement among the four methods. If the calculated boundary conditions as detected by the sensor creates a conflict among the four detection methods such that there is not a substantial agreement of all four methods, then a valid result is dependent upon whether there is substantial agreement between two or three of the detection methods. If there is substantial deviation in the detection of the valid impedance pulse by all four methods, then the method having the highest weighted factor is used as the valid detection.

Figure 8:
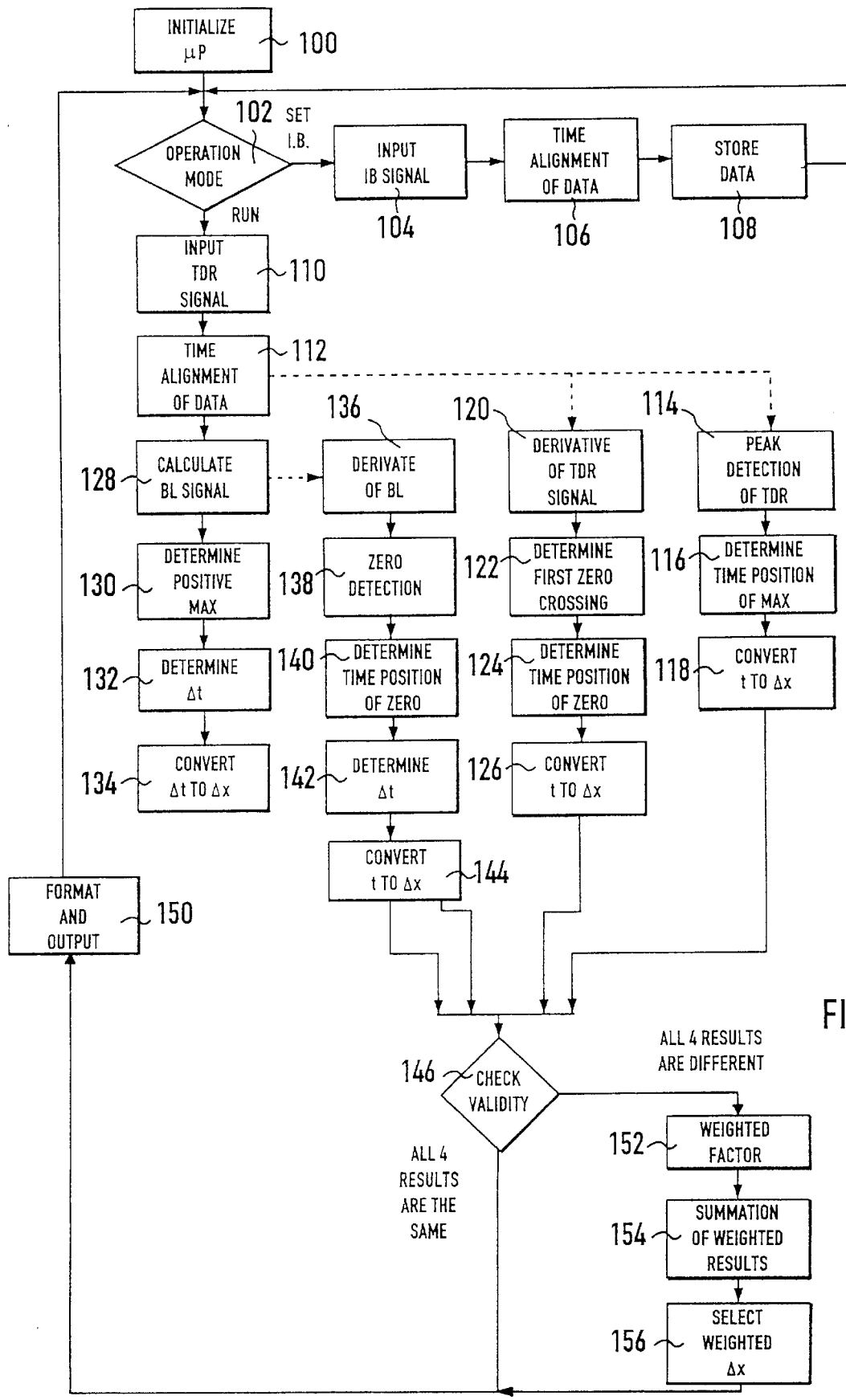
FIG. 8 is a flow chart illustrating the steps performed by the processor apparatus of the present invention to determine an actual, valid level indication of the process variable based on a reflective pulse caused by the process variable.

In the present invention, the microprocessor 46 is programmed with software to calculate the position of the valid impedance change caused by interface 26 using each of the four methods discussed above. FIG. 8 illustrates the steps performed by the microprocessor 46 of the present invention to determine the valid signal. The microprocessor 46 is first initialized as illustrated at block 100. Operation mode of the signal processor is illustrated at block 102.

The first operational mode is to set and store the initial boundary (I.B.) signal illustrated in FIG. 3. This initial boundary signal is generated before the process material is placed in vessel 14. Microprocessor 46 first receives an input initial boundary signal as illustrated at block 104. The data is then time aligned based on the initial impedance change caused by the mounting 16 as illustrated as block 106. Microprocessor 46 then stores the time aligned data related to the initial boundary conditions in the EEPROM 50 as illustrated at block 108. Once the initial boundary signal is stored, microprocessor 46 returns to operation mode at block 102.

In one embodiment, the signal processor of the present invention may establish the initial boundary conditions manually only during initial installation of the sensor apparatus 10 into the vessel 14. In another instance, the initial boundary conditions may be updated at predetermined times during operation of the signal processor.

During normal operation of the signal processor, microprocessor 46 receives an input TDR signal as illustrated at block 110. This input TDR signal is a digital representation from analog-to-digital converter 44 of the TDR analog signal illustrated in FIG. 2. Although reference will be made to the analog signals in FIGS. 2–7, it is understood that the microprocessor 46 of the present invention uses the digital representation of these signals. It is also understood that an analog processor may be used to process the analog signals in accordance with the present invention.

Microprocessor 46 next provides a time alignment of the TDR signal as illustrated at block 112. In other words, microprocessor 46 time shifts the input TDR signal so that the time zero begins at the location of the interface of mounting 16 which is indicated by the initial large reflection pulse 54 shown in FIG. 2.

In the illustrated embodiment, microprocessor 46 uses four different detection methods to locate a valid pulse reflection indicative of the interface 26 between the first medium 11 and the second medium 12. In a first method, microprocessor 46 detects a peak reflection pulse of the time aligned TDR signal (illustrated in FIG. 4) as illustrated in block 114 of FIG. 8. Peak 71 in FIG. 4 is the valid reflection pulse corresponding to interface 26. However, the peak detection step in this example would determine that peak 115 is the valid peak. Peak 115 actually corresponds to interference in vessel 14 to be the valid pulse. This explains why the peak detection method of the time aligned TDR signal, when used alone, may produce some inaccuracies. Microprocessor 46 then determines a time corresponding to the position of the maximum pulse value as illustrated at block 116 in FIG. 8. The time value is then converted to a distance between the top surface 20 of vessel 14 and the interface 26. This step is illustrated at block 118. This distance result calculated using the first detection method is then stored.

It is understood that once a time position of an impedance change on a sensor has been derived, there are a number of techniques that can be used to convert the detected time to a distance equivalent position of the interface 26 of the process variable. The time intervals between the impedance changes have a mathematical relationship such that the time relation between the impedance change is proportional to the speed of light and a continuous function of the relative dielectric constants of the subject materials. If the first medium 11 is air, the dielectric constant is substantially equal to 1.0. The subject time of the interval can then be corrected by applying the continuous functional relation relative to the material dielectric and the environmental surroundings.

Other techniques such as using a sensor or conductor of a known length and then using the relationship changes of the pulse travel times form a subject material interface to an end 19 of the probe element 18 may be used. In other words, once the location of the valid impedance pulse is determined, a time or distance between the impedance interface and the end 19 of probe element 18 can be used to determine the level of the interface 26. In the case of a sensor having a known length, differential time intervals from a material interface 26 to end 19 of the probe element 18 changes proportionally with the thickness of the subject material 12 divided by a continuous functional relationship of the material dielectric constant. Provided the probe element 18 has a fixed location relative to the vessel 14, the material level or thickness of the material is an offset relative to sensor position. This positional relationship is determined using a simple mathematical equations.

Similarly, the velocity of a pulse traveling on a sensor passing through multiple material layers can be used to determine the level of each material, provided the relative dielectric constant of each material is known. When the sensor has a fixed location relative to vessel 14, the position of each material can be determined as a function of the time differential, with an offset to the sensor position. A sensor can also be designed having markers at known distances to create signal reflections that can be used for calibration and/or determining material dielectric values.

Microprocessor 46 also calculates a derivative of the time aligned TDR signal as illustrated at block 120. An analog representation of this derivative signal is illustrated in FIG. 5. Microprocessor 46 then determines the location of a first zero crossing adjacent an absolute maximum value of the signal. If the maximum is obtained from a positive value, microprocessor 46 determines the next subsequent zero crossing after the positive peak. If the absolute maximum was obtained from a negative value, the microprocessor 46 determines the first zero crossing prior to the detected absolute maximum. This step is illustrated at block 122.

Microprocessor 46 then determines a time value corresponding to the detected zero crossing as illustrated at block 124. This time value is then converted to a distance corresponding to the level of the interface 26 between first medium 11 and second medium 12 as illustrated at block 126. The distance calculated using the second detection Method is then stored.

In the third detection method, the microprocessor 46 calculates a baseline (BL) signal by subtracting the initial boundary signal stored in EEPROM 50 (FIG. 3) from the time aligned TDR signal which is illustrated in analog form in FIG. 4 as illustrated at block 128. This baseline signal is illustrated in analog form in FIG. 6. Microprocessor 46 then determines a location of the positive maximum value of the baseline signal as illustrated at block 130. This positive maximum value is illustrated at location 86 in FIG. 6. Microprocessor 46 next determines the time value corresponding to the detected positive maximum value as illustrated at block 132. Microprocessor 46 then converts the time value to a distance change indicating the location of interface 26 between the first medium 11 and second medium 12 as illustrated at block 134. The distance calculated using the third detection methods is then stored.

In the fourth detection method, Microprocessor 46 generates a first derivative of the baseline signal as illustrated at block 136. An analog representation of the first derivative of the baseline signal is illustrated in FIG. 7. Microprocessor 46 then determines a location of a zero crossing adjacent an absolute maximum value as illustrated at block 138. If the absolute maximum comes from a positive value, the next subsequent zero crossing is used. If the absolute maximum is from a negative value, the first preceding zero crossing is used as a location of interface 26. Microprocessor 46 then determines the time position of the zero crossing at block 140. In the FIG. 7 example, the first preceding zero crossing 94 adjacent negative peak 92 is used as the time position. Microprocessor 46 then determines the time change as illustrated at block 142. This time change is then converted to a distance change as illustrated at block 144 to provide an indication of the level of the interface 26 between the first medium 11 and second medium 12. This distance change calculated using the fourth detection method is then stored.

Microprocessor 46 next checks the validity of the detected distances from each of the four methods discussed above as illustrated at block 146. Each of the distance changes is rounded to a predetermined sensitivity level, for example, one millimeter. If all four stored results from each of the four methods are the same, microprocessor 46 determines that a valid output has been determined. Therefore, microprocessor formats the output into an appropriate form and sends the result to the output 52 as illustrated at block 150.

If the four stored results from the four detection methods are different, microprocessor 46 then takes into account weighted factors established for each of the detection methods as illustrated at block 152. At this point, microprocessor 46 may compare the four stored method results to a previous result. If any of the four stored results deviates from the previous result by more than a predetermined amount, the microprocessor 46 may disregard such a stored result. Microprocessor 46 provides a summation of the weighted results as illustrated at block 154. Examples of this summation by microprocessor 46 are provided below. Microprocessor 46 then selects the most appropriate distance as the valid impedance reflection from interface 26 using the weighted results at block 156. Microprocessor 46 then outputs this selected result at block 150.

Three different examples are provided to illustrated the effect of the weighted factors on the process measurement.

EXAMPLE 1

| Method | X (cm) | W.F. | Selected Result |
|---|---|---|---|
| Peak TDR | 29.0 | 1.0 | |
| Der. TDR | 36.9 | 1.0 | |
| Max. BL | 37.1 | 1.1 | 37.1 |
| Der. BL | 37.3 | 1.0 | |

EXAMPLE 2

| Method | X (cm) | W.F. | Selected Result |
|---|---|---|---|
| Peak TDR | 36.9 | 1.0 | |
| Der. TDR | 37.3 | 1.0 | 37.3 |
| Max. BL | 37.1 | 1.1 | |
| Der. BL | 37.3 | 1.0 | |

EXAMPLE 3

| Method | X (cm) | W.F. | Selected Result |
|---|---|---|---|
| Peak TDR | 37.1 | 1.0 | |
| Der. TDR | 37.3 | 1.0 | |
| Max. BL | 37.1 | 1.1 | 37.1 |
| Der. BL | 37.3 | 1.0 | |

In Example 1, each of the detected results for the level or distance X of the interface 26 is different. In this instance, the greatest weighted factor indicates that the maximum detected baseline value is used. Therefore, the selected result by microprocessor 46 is 37.1 cm.

In Example 2, the maximum baseline method still indicates a distance of 37.1 cm. However, both the derivative of the TDR signal method and the derivative of the baseline signal method provided a result of 37.3 cm. Therefore, the distance of 37.3 cm has a weighted factor of 2.0 when the two identical results are added together. Distance 36.9 cm from the peak TDR signal method has a weighted factor of 1.0. Distance 37.1 due to the maximum baseline method has a weighted factor of 1.1. Therefore, microprocessor 46 selects the greatest weighted factor of 2.0 and the corresponding distance result of 37.3 cm during the selection step at block 156 in FIG. 8.

In Example 3, both the peak TDR method and the maximum baseline method provided a distance result of 37.1 cm. The derivative TDR method and the derivative baseline method both produced a result of 37.3 cm. Therefore, the distance 37.1 has a weighted factor of 2.1, while the distance 37.3 cm has a weighted factor of 2.0. Therefore, microprocessor 46 selects the result of 37.1 cm during the selection step at block 156.

It is understood that other detection techniques may be used in accordance with the present invention. In addition, one of the other detection techniques may be applied the highest weighted factor, if desired. In an alternate embodiment, each of the detection techniques may be assigned a different weighted factor. Such weighted factors are selected and applied on the basis of application knowledge and experience.

A further technique for determining the valid interface 26 is pattern recognition using the baseline signal illustrated in FIG. 6. The pattern recognition technique uses the entire pattern of the reflected pulse 82 shown in FIG. 6 and a number of sampled points taken after a reflected pulse 82 has reached a threshold voltage. The timing of the points must fall within specific boundaries for the pattern to be considered valid. This technique is an improvement over existing peak detection methods in that it protects against false readings due to signal-pulse spikes produced by noise and other phenomena.

Figure 9:
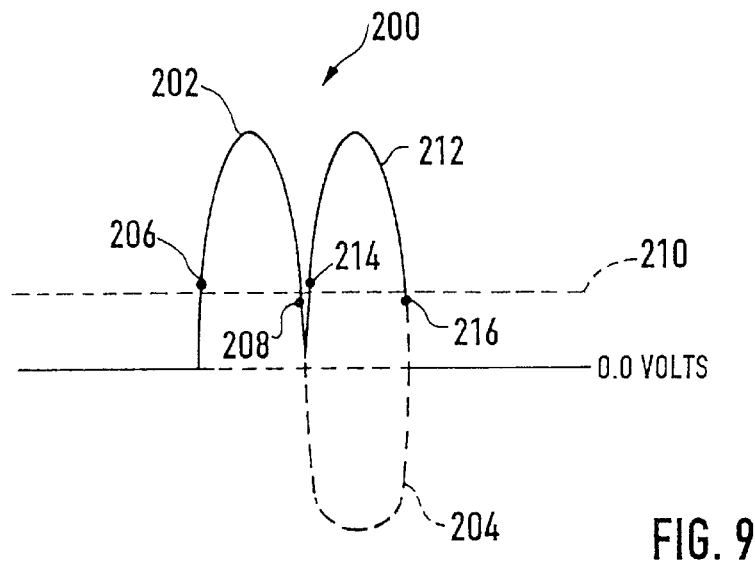
FIG. 9 is an analog baseline signal corresponding to the signal shown in FIG. 6 illustrating the pattern recognition technique of determining the valid baseline signal.

Referring to FIG. 9 a reflected signal 200 includes a positive-going component 202 and a negative-going component 204 (shown in broken lines) and is nearly sinusoidal in shape. The baseline reflected signal 200 is centered about zero volts as can be seen in FIG. 6.

In the baseline method for determining the valid interface 26, the center of positive-going component 202 of the reflected signal 200 (i.e., the process material level) is determined by identifying two points 206 and 208 on the positive-going component 202 of the reflected signal 200 with respect to a threshold voltage 210. The midpoint between these points 206 and 208 is the center of the positive going component 202 of the reflected signal 200. Points on the negative going component 204 are replaced with zeroes.

In the pattern recognition technique the points on the negative going component 206 are not replaced with zeroes. Instead the negative points are converted to their absolute value using the 2's complement technique. The 2's complement technique is well known to those skilled in the art for determining absolute value of negative signed numbers and is described and explained in standard textbooks. See for example the textbook *Digital Concepts & Applications*, published 1990 by Saunder's College Publishing (a division of Holt, Rinehart and Winston) p. 225. The result of the use of the 2's complement technique is a second positive-going component 212 creating dual positive-going peaks 202 and 212.

According to the pattern recognition technique the valid interface 26 for the process material is determined by using a four (4) point pattern and the dual positive-going peaks 202 and 212 of the entire reflected pulse 200. Once the first point 206 is detected relative to the threshold voltage 210 the second point 208, third point 214 and the fourth point 216 on the positive going peaks 202 and 212 must occur within specific time frames from the first point 206. The time frames are determined by the overall 218 width of the valid reflected pulse 200. If the four (4) points 206, 208, 214 and 216 do not occur within the specific time frames then the reflected pulse 200 is considered invalid.

If the reflected pulse 200 is found to be valid, then the center of the first positive-going peak 202 (i.e. the valid interface 26 for the process material) is determined by calculating the mid-point between the first point 206 and the second point 208. It will be understood that the number of points in the pattern need not be limited to four. Additional points could be used without departing from the scope of the present invention.

It is well known that variations in operating conditions such as; environmental variations, (temperature, humidity, pressure,) power supply variations (voltage, current, power) electromagnetic influences (rf/uwave radiated power creating biases on IC outputs) and other conditions such as mechanical vibration can induce undesired drifts of electronics parameters and output signals.

In order to compensate for drifts in time and voltage in reflected signals due to the above-described variations in operating conditions, a further embodiment of the present invention includes a corrective element or factor that is calculated every time the software executes a signal processing loop. The correction element or factor is then added to each signal sample prior to use of the baseline subtraction method described previously.

Figure 10:
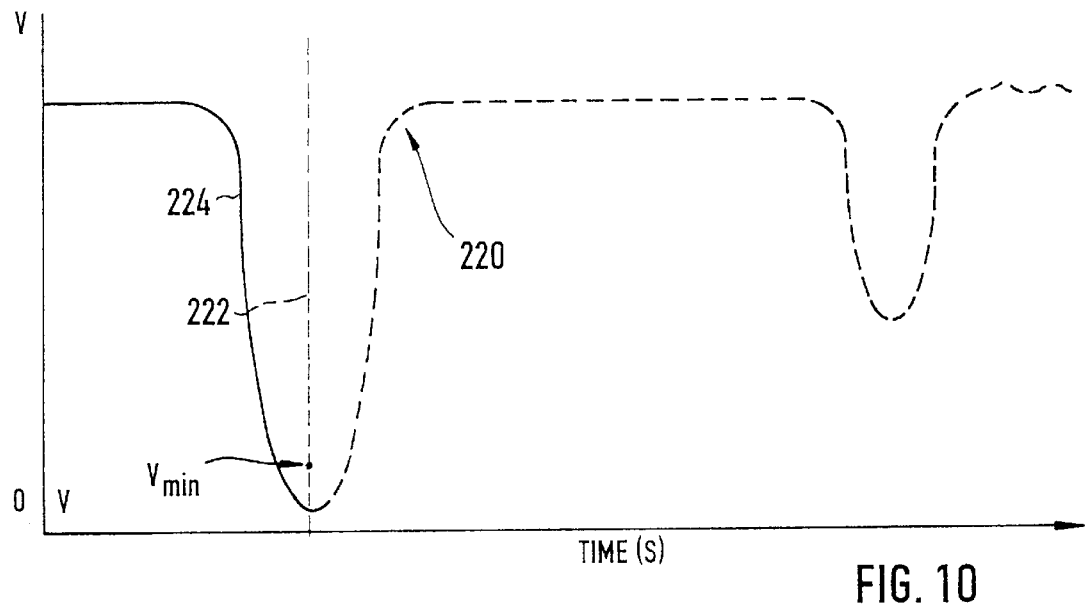
FIG. 10 is an analog initial boundary or probe map time aligned signal corresponding to FIG. 3.

Referring to FIG. 10, an initial boundary or probe map time aligned signal 220 that has been digitized and store in a microprocessor is shown. This signal 220 corresponds to signal 62 shown in FIG. 3. The signal 220 is time aligned relative a starting voltage $V_{min}$ which is located on the starting center line 222 of the negative going component 224 of the signal 220.

Figure 11:
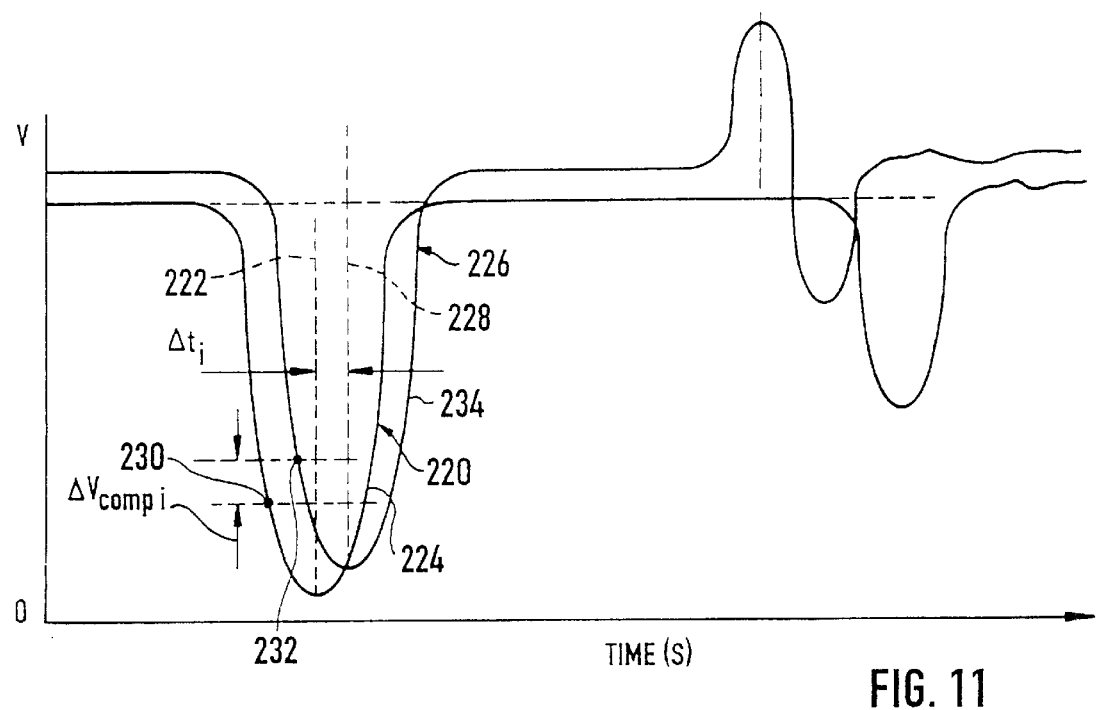
FIG. 11 is an analog illustration of the drift of a real time initial boundary signal relative to the initial boundary signal shown in FIG. 10 caused by variations in operating conditions.

FIG. 11 illustrates a situation where the real time TDR signal 226 has drifted in both time and voltage relative to the initial boundary signal 220. When the baseline procedure is used in this situation, the results will not be valid. This invalid result can be overcome and corrected to compensate for these signal drifts using the correction element or factor according the present invention. The real time TDR signal 226 has a new center line 228 which has shifted in time $\Delta t_i$ and has shifted in voltage $\Delta v_{compi}$.

The compensation can be accomplished by obtaining the time and voltage variations $\Delta t_i$ and $\Delta v_{compi}$ and adjusting the digitized real time TDR signal 226 by the drift $\Delta t_i$ and $\Delta v_{compi}$. The correction factor $V_{corr}$ is calculated by subtracting a specific point 230 on the negative-going component 224 of the initial boundary of the probe map signal 220 from its corresponding point 232 on the negative-going component 234 of the real-time TDR signal 226, then inverting the result using the 2's complement technique. This yields a number $V_{corr}$ that is always added to the real time TDR signal 226, regardless of offset polarity of the signals 220 and 226. The correction factor $V_{corre}$ is represented algebraically by the formula:

$$V_{corr} = -(V_{real} - V_{pm}),$$

where $V_{corr}$=correction factor $V_{real}$=point 232 on the real-time TDR signal 226

$V_{pm}$=corresponding point 230 on the initial boundary on the probe map signal 220

Figure 12:
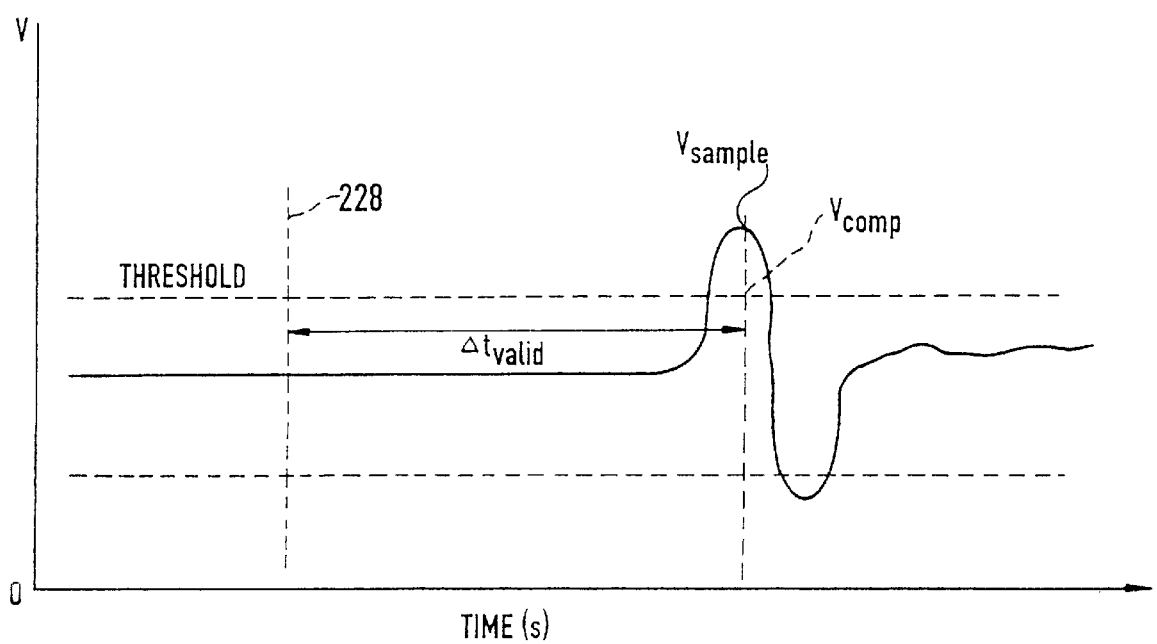
FIG. 12 is an analog illustration of a baseline signal after the application of a correction factor according to the present invention to compensate for the drift in the signal shown in FIG. 11.

The compensated sample point $V_{comp}$ (i.e. the center of the valid signal) is determined by the formula:

$$V_{comp} = V_{sample} + V_{corr},$$

where $V_{comp}$=value of the compensated sample point $V_{sample}$=value of the uncompensated point $V_{corr}$=correction factor The baseline procedure can be performed upon completion of this compensation in time and voltage. The resulting baseline signal is shown in FIG. 12. This compensated result provides a valid reflection pulse that is easily analyzed providing the desired valid and accurate $\Delta t_{valid}$.

Figure 13:
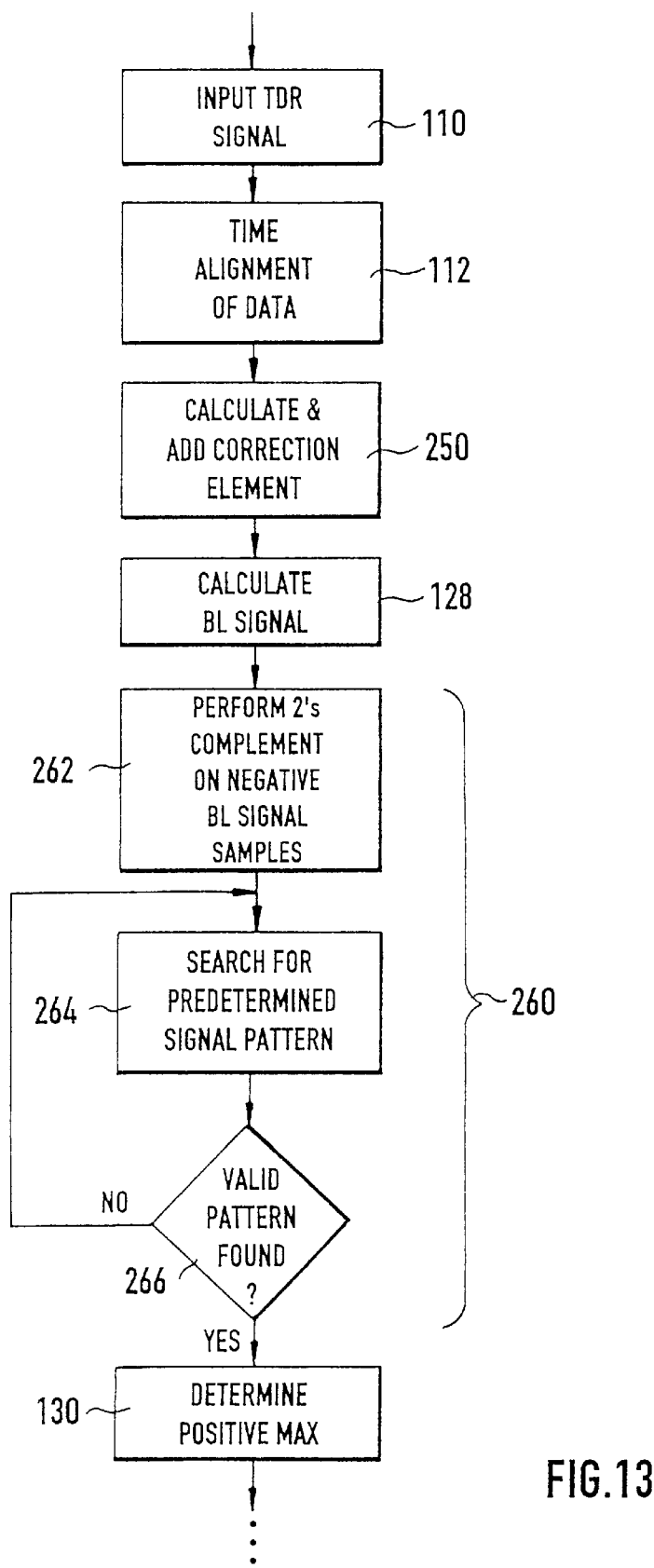
FIG. 13 is a segment of the flow chart illustrated in FIG. 8 incorporating the steps performed by the processor apparatus of the present invention to determine and apply the correction factor and to use the pattern recognition technique to determine an actual, valid level indication of the process variable based on a reflective pulse caused by the process variable.
Figure 14:
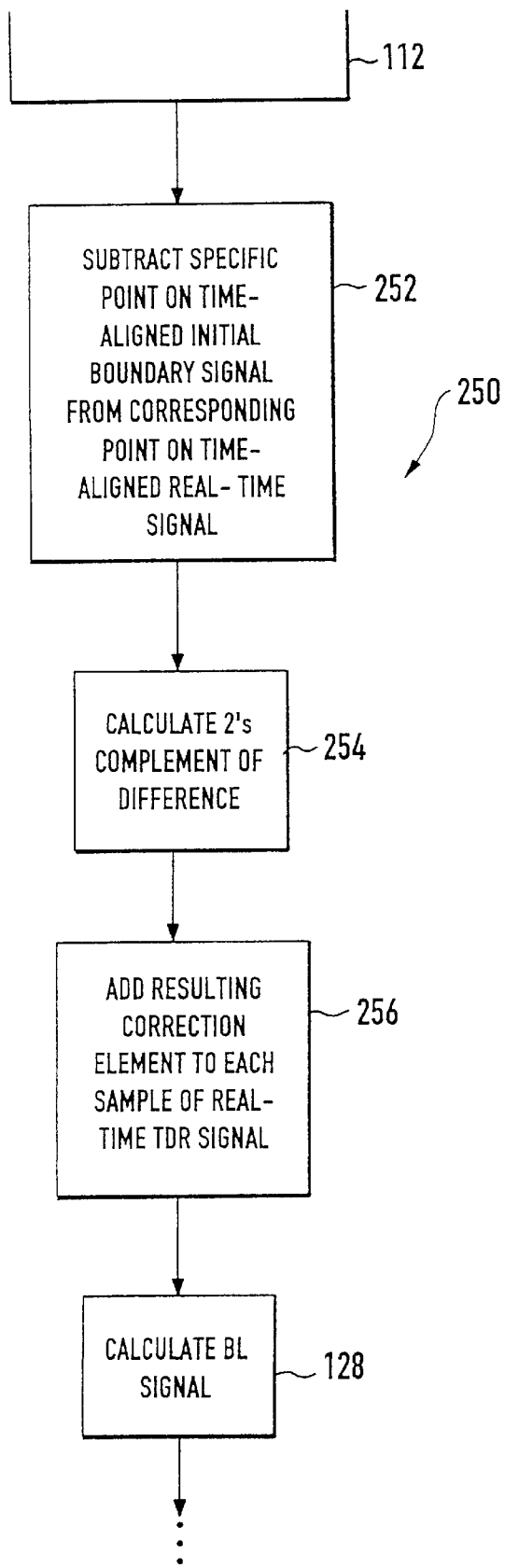
FIG. 14 is a flow chart expanding the steps performed in block 250 in FIG. 13 for calculating and adding the correction factor to the initial boundary signal.

In order to implement the pattern recognition technique and the correction factor shown illustrated in FIGS. 9–12, the software programmed in the microprocessor 46 is modified as shown in FIGS. 13 and 14. FIGS. 13 and 14 illustrate the additional steps performed by the microprocessor 46 as a result of the software modifications. The additional steps are shown inserted in the appropriate locations within the steps illustrated in FIG. 8. Thus reference numerals in FIGS. 13 and 14 corresponding to reference numerals in FIG. 8 are intended to denote the same steps. Further, although not shown in FIGS. 13 and 14, it will be understood that the remainder of the steps shown in FIG. 8 occurring before and after steps 110 and 130 respectively would be performed in connection with the steps shown in FIGS. 13 and 14. Steps 136–140, steps 120–126 and steps 114–118 would not be performed when using the pattern recognition technique. However, the correction factor could be used without the pattern recognition technique in which case all of the steps in FIG. 8 may be performed.

Referring to FIGS. 13 and 14, the step for calculating and adding the correction factor is shown in block 250 and is performed between blocks 112 and 128 in the process illustrated in FIG. 8. A more detailed breakdown of the steps performed in block 250 is shown in FIG. 14.

Referring to FIG. 14, after the microprocessor 46 provides a time alignment of the TDR signal in block 112, the microprocessor 46 then subtracts the specific point 230 on the initial boundary signal 220 from the corresponding point 232 on the real-time signal 226 in block 252 in accordance with the formula set forth above. In block 254, the microprocessor 46 then uses the 2's complement technique on the negative difference value between points 232 and 230.

After the 2's complement technique is applied then the correction factor $V_{corr}$ determined in block 252 is added to the uncompensated sample point of the real time TDR signal to produce a value of the compensated sample point $V_{comp}$. Thereafter, the microprocessor 46 calculates a baseline (BL) signal by subtracting the initial boundary signal from the time aligned and corrected TDR signal to produce the baseline signal illustrated in analog form in FIG. 12. It will be understood that after block 123 the microprocessor 46 may proceed to block 136, block 120, block 114 or use the pattern recognition technique as shown in FIG. 13 at 260.

Using the pattern recognition technique the microprocessor 46 first uses the 2's complement technique on the negative-going component 204 of the baseline signal 200 (See FIG. 9) in block 262. Thereafter the microprocessor 46 searches for the predetermine four (4) point pattern (determined based upon the width 218 of the signal) in block 264 as shown in FIG. 9. If the predetermined pattern is not found then the microprocessor 46 continues to search baseline signal samples until a valid pattern is found. This step is performed in block 266. Once a valid pattern is found, then the microprocessor 46 determines a location of the positive maximum value of the valid baseline signal in block 130 shown in FIG. 8.

In order to determine the baseline signal shown in FIG. 6, the initial boundary signal of FIG. 3 is subtracted from the time aligned TDR signal of FIG. 4. Ideally the initial boundary signal or probe map over the entire sensor length is measured and stored before the first and second mediums 11 and 12 are placed in the vessel 14. In practice, it is often impractical to empty the vessel 14 to determine an initial boundary signal every time a probe 18 is installed in the vessel 14 or when for another reason the initial background signal needs to be updated. When the probe 18 is installed in the vessel 14 containing material 12, a portion of the probe 18 above the interface 26 is not immersed in the material 12 and a portion of the probe 18 below the interface 26 is immersed in the material 12. Partial probe mapping combines a portion of the field measured sample TDR signal with a portion of a background signal determined at the factory or in the field to generate an initial boundary signal for the entire length of the probe 18 without having to empty the vessel 14. The partial probe mapping can be done immediately after installation of the probe 18 or during operation to update the initial boundary signal.

Figure 15:
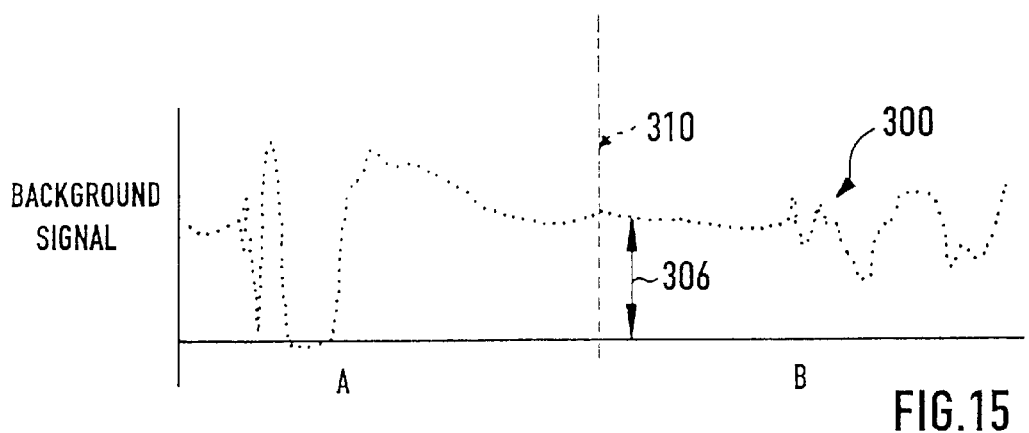
FIG. 15 shows a background signal for the probe.
Figure 16:
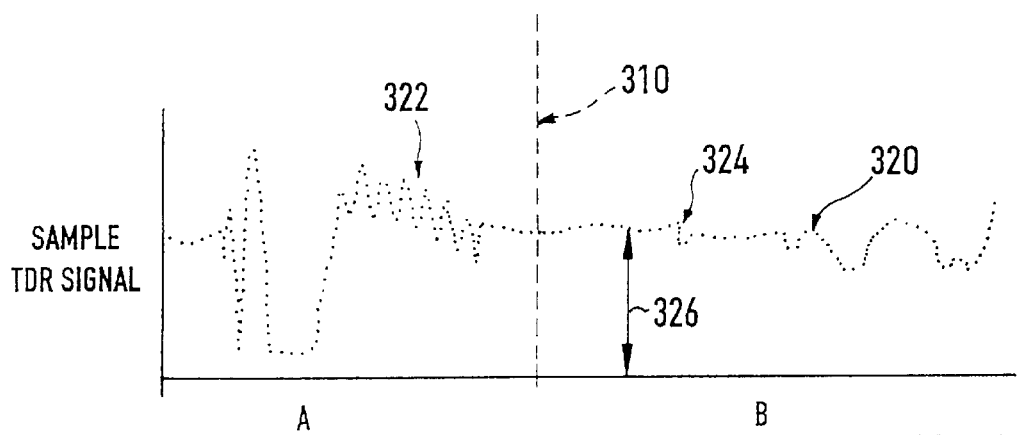
FIG. 16 shows a sample TDR signal captured in the vessel.
Figure 17:
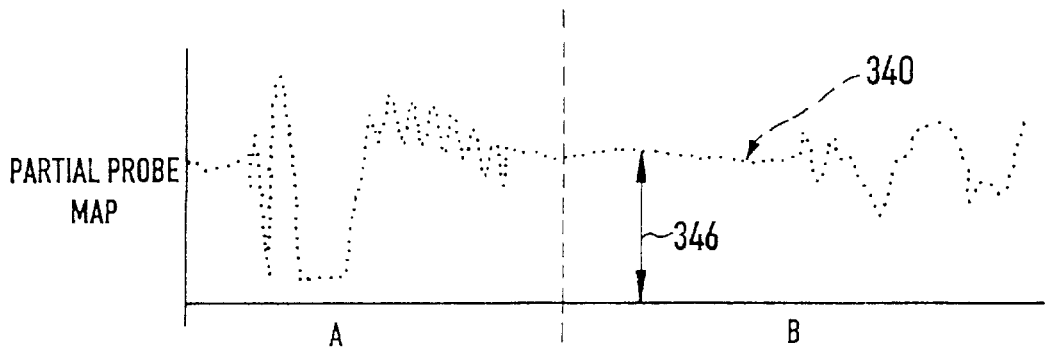
FIG. 17 shows a partial probe map generated by combining portions of the background signal and portions of the sample TDR signal.

The partial probe mapping process is illustrated in FIGS. 15, 16 and 17. FIG. 15 shows a background signal 300 stored for the probe 18. The background signal 300 is either initially measured at the factory or determined at the installation site and stored in EEPROM 50 for later use with the probe 18. The background signal 300 is divided by a transition point 310; portion A is the signal for the portion of the probe 18 above the transition point 310, the upper portion, and portion B is the signal for the portion of the probe 18 below the transition point 310, the lower portion.

FIG. 16 shows a sample TDR signal 320 sensed by the probe 18 installed in the vessel 14 when the probe 18 is partially immersed in the material 12. The sample TDR signal 320 is captured for the generation of a partial probe map. The sample TDR signal 320 includes several reflective pulses 322 caused by internal structures of the mounting structure and artifacts of the vessel 14. The sample TDR signal 320 is divided by a transition point 310 corresponding to the transition point 310 for the background signal 300; portion A is the signal for the portion of the probe 18 above the transition point 310, the upper portion, and portion B is the signal for the portion of the probe 18 below the transition point 310, the lower portion. The transition point 310 is chosen such that portion A of the sample TDR signal 320 is for a portion of the probe 18 which is not immersed in or in contact with the material 12 and is hanging straight. The reflected level of the interface 26 with the material 12 is indicated by the fluctuation 324 in the sample TDR signal 320.

FIG. 17 shows a partial probe map 340. The partial probe map 340 is computed by combining the non-immersed probe range up to a transition point 310 from the sample TDR signal 320 with the remainder of the probe range stored in the background signal 300. Thus, the resulting partial probe map 340 shown in FIG. 17 is a combination of the sample TDR signal 320 above the transition point 310, portion A of FIG. 16, with the background signal 300 below the transition point 310, portion B of FIG. 15. An adjustment is needed at the transition point 310 to account for the difference in the offset 306 of the background signal 300 and the offset 326 of the sample TDR signal 320. This adjustment accounts for offset drift of the sample TDR signal, noise and ringing attenuation, as well as reflections from extraneous objects in the vessel 14 not mapped previously. After adjustment the partial probe map 340 has an offset 346.

A minimum probe range or length of 5 meters (15 feet) is preferred for performing a partial probe map. The transition point 310 should be chosen such that it is above the interface 26 with the material 12, while at the same time being at least 1 meter below the interface between the probe 18 and the mounting apparatus 16. For accuracy, partial probe mapping should not be performed near the end of the probe length.

The calculation of the adjustment to the offset 326 of the sample TDR signal 320 and to the offset 306 of the background signal 300 at the transition point 310 is required for an accurate partial probe mapping. The adjustment is applied to the offset 306 of portion B of the background signal 300 to smooth the partial probe map 340 at the transition point 310. If the adjustment is not made then there is a discontinuity in the partial probe map 340 at the transition point 310, the discontinuity could be interpreted as a signal showing the level of the material 12 in the vessel 14. The adjustment value can be computed by many methods some of which are described below.

One method of computing the adjustment is simply to calculate the difference between the sample TDR signal 320 at the transition point 310 and the background signal 300 at the transition point 310. This will assure an equal signal value for both the sample TDR signal 320 and the background signal 300 at the transition point 310 eliminating any discontinuity in the partial probe map 340.

In order to overcome fluctuations in the sample TDR signal 320 and the background signal 300 around the transition point 310 a more robust adjustment calculation may be required such as performing averaging or root mean square (RMS) calculations over portions of the two signals. The more robust adjustment calculations, such as averaging or RMS, could be done over the entire range of the signal or over a smaller portion of the signal. Accordingly, a second method is to compute the adjustment as the difference between the average values of the two signal portions used to generate the partial probe map 340. This is the difference between the average signal value over portion B of the background signal 300 and the average signal value over portion A of the sample TDR signal 320. A third method is to compute the adjustment as the difference between the average values over the lower portions of the two signals. This is the difference between the average signal value over portion B of both the background signal 300 and the sample TDR signal 320. A fourth method is to compute the adjustment as the difference between the average value over the entire range of both signals. This is the difference between the average signal value over the entire range of the background signal 300 and the average signal value over the entire range of the sample TDR signal 320. A fifth method is to compute the adjustment as the difference between the average values of the upper portions of the two signals. This is the difference between the average signal value over portion A of the background signal 300 and the average signal value over portion A of the sample TDR signal 320. In the preferred embodiment, the third method is used.

Instead of using the entire probe range to compute the adjustment value a smaller interval on the background signal 300 and the sample TDR signal 320 could be used. Another alternative method is to compute the adjustment as the difference between the average signal value over a small interval surrounding the transition point 310. This could be the difference between the average signal value over a small interval of portion A of the background signal 300 near the transition point 310 and the average signal value over a small interval of portion A of the sample TDR signal 320 near the transition point 310. For example for digitized signals, the adjustment could be the difference between the average of the four sample points in portion A of the background signal 300 nearest the transition point 310 and the average of the four sample points in portion A of the sample TDR signal 320 nearest the transition point 310.

The partial probe map 340, which is a combination of portion A of the sample TDR signal 320 and portion B of the background signal 300 adjusted by the chosen adjustment factor, is stored for use as the initial boundary signal. This initial boundary signal is used as previously described to determine the level of the material 12 in the vessel 14.

Although the invention has been described in detail with reference to a certain preferred embodiment, variations and modifications exist within the scope and spirit of the present invention as described and defined in the following claims.

What is claimed is:

1. A method for processing a time domain reflectometry (TDR) signal having a plurality of reflection pulses to generate a valid output result corresponding to a process variable for a material in a vessel, the method comprising the steps of:

determining a background signal for a probe;

detecting a sample TDR signal for the probe in the vessel;

establishing at least one transition point on the sample TDR signal and the background signal;

combining a portion of the sample TDR signal on one side of the at least one transition point with a portion of the background signal on the other side of the at least one transition point to establish an initial boundary signal;

storing the initial boundary signal;

detecting the TDR signal;

calculating the output result using the initial boundary signal.

2. The method of claim 1 further comprising the step of calculating an adjustment value to minimize discontinuity of the initial boundary signal at the at least one transition point of the sample TDR signal and the background signal.

3. The method of claim 2 further comprising the step of adding the adjustment value to the portion of the background signal combined to establish the initial boundary signal.

4. The method of claim 3 wherein the adjustment value is calculated by subtracting the value of the background signal at the at least one transition point from the value of the sample TDR signal at the at least one transition point.

5. The method of claim 3 wherein the adjustment value is calculated by subtracting the average value of the portion of the background signal used to establish the initial boundary signal from the average value of the portion of the sample TDR signal used to establish the initial boundary signal.

6. The method of claim 3 wherein the adjustment value is calculated by subtracting the average value of the background signal on one side of the at least one transition point from the average value of the sample TDR signal on the same side of the at least one transition point.

7. The method of claim 3 wherein the adjustment value is calculated by subtracting the average value of the background signal from the average value of the sample TDR signal.

8. The method of claim 3 wherein the adjustment value is calculated by subtracting the average value of the background signal in a small interval near the at least one transition point from the average value of the sample TDR signal in a small interval near the at least one transition point.

* * * * *

UNITED STATES PATENT AND TRADEMARK OFFICE
CERTIFICATE OF CORRECTION

PATENT NO. : 5,973,637
DATED : October 26, 1999
INVENTOR(S) : Kenneth Lee Perdue, Willam Patrick McCarthy, Donald D. Cummings, and Gerd Wartmann It is certified that error appears in the above-identified patent and that said Letters Patent is hereby corrected as shown below:

The following references as cited by the Examiner are included in the References Cited section:

| | | |
|---|---|---|
| 5,609,059 | 3/11/1997 | McEwan |
| 5,610,611 | 3/11/1997 | McEwan |
| 5,689,265 | 11/18/1997 | Otto et al. |
| 5,734,346 | 3/31/1998 | Richardson et al. |

Signed and Sealed this

First Day of August, 2000

*Attest:*

Q. TODD DICKINSON

*Attesting Officer*  *Director of Patents and Trademarks*